(12) United States Patent
Shai et al.

(10) Patent No.: US 7,607,933 B2
(45) Date of Patent: Oct. 27, 2009

(54) PORTABLE TOOLBOX LOCKER

(76) Inventors: Moti Shai, 3524 Via del Prado, Calabasas, CA (US) 91302; Aliza Narbonne, 19125 Haynes St., Reseda, CA (US) 91302

( * ) Notice: Subject to any disclaimer, the term of this patent is extended or adjusted under 35 U.S.C. 154(b) by 282 days.

(21) Appl. No.: 11/471,176

(22) Filed: Jun. 20, 2006

(65) Prior Publication Data
US 2008/0047726 A1 Feb. 28, 2008

(51) Int. Cl.
*H01R 13/62* (2006.01)
(52) U.S. Cl. .................. 439/373; 439/304; 439/577
(58) Field of Classification Search .......... 439/373, 439/577, 304; 248/229.12, 228.14, 228.5; 224/404, 543
See application file for complete search history.

(56) References Cited

U.S. PATENT DOCUMENTS

| | | | | |
|---|---|---|---|---|
| 2,266,560 A | * | 12/1941 | Mansfield | 439/368 |
| 2,569,037 A | * | 9/1951 | Dalton | 439/368 |
| 4,080,029 A | * | 3/1978 | St. Fort | 439/131 |
| 4,504,103 A | * | 3/1985 | Woedl | 439/131 |
| 4,740,168 A | * | 4/1988 | Carney et al. | 439/133 |
| 5,052,737 A | * | 10/1991 | Farmer, Jr. | 296/39.2 |
| 6,276,952 B1 | * | 8/2001 | Ferranti et al. | 439/345 |
| 6,769,930 B1 | * | 8/2004 | McDevitt, Jr. | 439/373 |
| 6,811,415 B2 | * | 11/2004 | Chen | 439/133 |

* cited by examiner

*Primary Examiner*—Neil Abrams

(57) ABSTRACT

Apparatus and method to lock portable object like toolbox to a wall, comprising: a tool storage compartment, including a interior and a exterior, the tool storage compartment contains a electrical assembly. The electrical assembly is comprised of an electrical housing, a cable connector, including a lock and a outlet connector lock. The portable toolbox also contains a securing system, comprising, a handle, including a lock, interiorly, a stem, connected to the handle and an adjustable securing brace clamp, wherein first rotation of said handle, extends said adjustable securing brace to fit around a support structure, and a second rotation, secures and locks object like said toolbox to said structure like wall by the molding door jam.

4 Claims, 4 Drawing Sheets

PORTABLE TOOLBOX LOCKER

BACKGROUND OF THE INVENTION

1) Field of the Invention

The invention relates to tool storage, mobility and security.

2) Discussion of the Related Art

Construction workers are faced with a growing number of thefts on construction sites. Construction sites are targets for construction material, tools or toolboxes. Many times these items are taken during the night, lunch or restroom breaks. Tools can be locked in a box, but boxes can be taken. It is difficult to haul a large amount of materials or tools out of the site to a vehicle or secure place every time a worker goes on break, even more so from ten stories up.

Construction workers must have an effective means of storing large amounts of equipment, many times electrical or rechargeable that must remain plugged in, in a safe and time effective manner on the job site. Construction job sites are limited environments. Many times framing and scaffolding are all that exist, making security non-existent and the transportation of tools, risky. While, locking toolboxes are well known in the field, the disadvantages are their inability to provide security, mobility and storage to the construction worker, by not taking advantage of the construction site environment.

BRIEF DESCRIPTION OF THE DRAWINGS

The invention is described by way of example with reference to the accompanying drawings wherein.

DETAILED DESCRIPTION OF THE INVENTION

Figure 1:
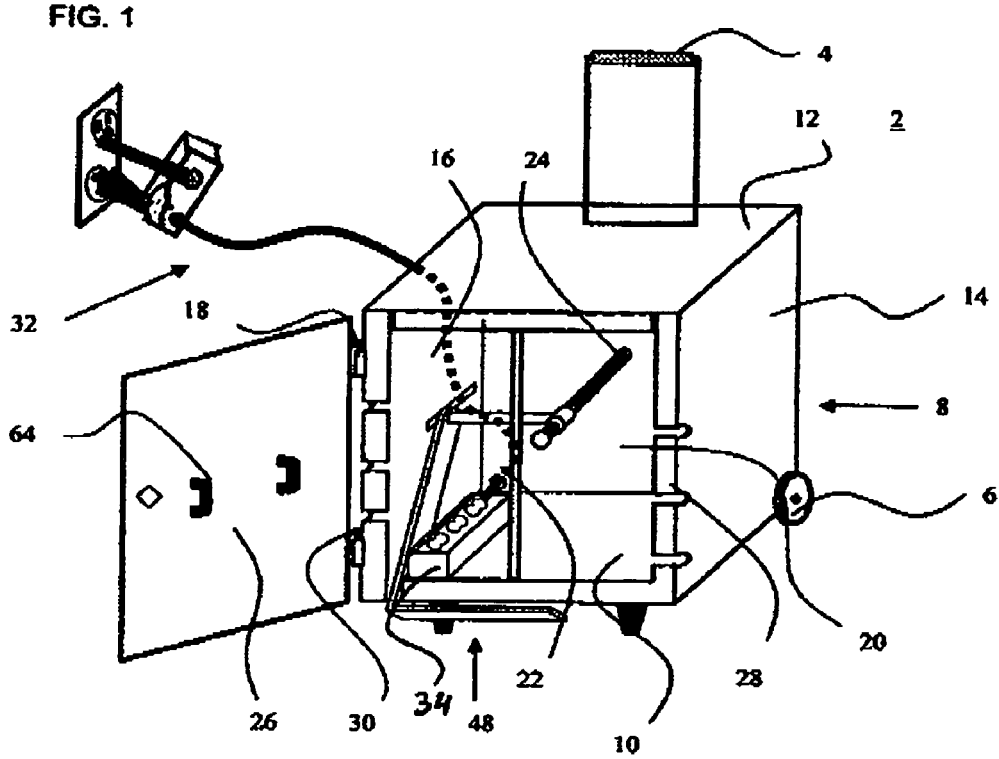
FIG. 1 is a front perspective of an embodiment of a portable toolbox.
Figure 2:
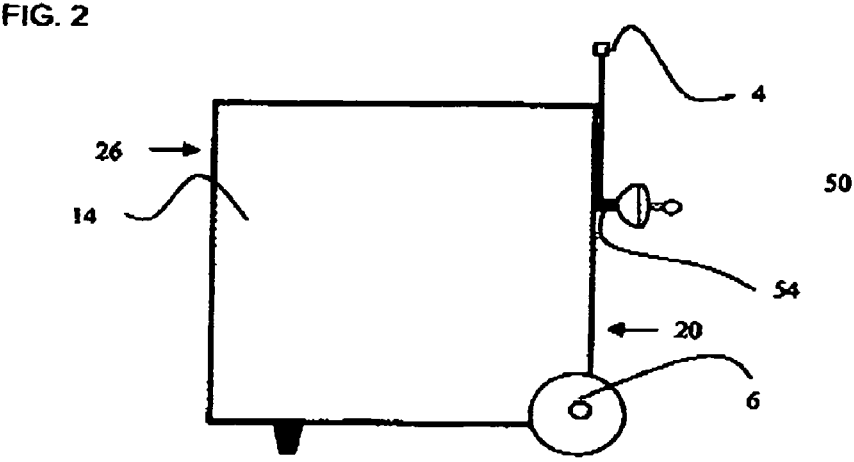
FIG. 2 is a side-view perspective of the portable toolbox in FIG. 1.

FIGS. 1 and 2 of the accompanying drawings illustrate a front perspective and a side-view a portable toolbox 2, respectively, according to an embodiment. The portable toolbox 2 includes a control handle 4, a plurality of wheels 6, a tool storage compartment 8, an electrical assembly lock 32 and a securing system 48.

The tool storage compartment 8, including a interior and a exterior, is defined by a first wall 10, exteriorly, connected to said plurality of wheels 6, opposing a second wall 12, a third wall 14, including a plurality of cable holders 28, opposing a fourth wall 16, said fourth wall including a plurality of hinge receptors 18, a plurality of cable holders 28, perpendicular to said first 10 and second walls 12, a fifth wall 20, including a first hole 22, a second hole 24, perpendicular to said third 14 and fourth walls 16, contacting said control handle 4, opposing a sixth wall 26, said sixth wall 26, a plurality of hinge pins 30, said plurality of hinge pins 30 positioned to fit within hinge receptors 18 of said fourth wall 16, providing access, interiorly.

Figure 3:
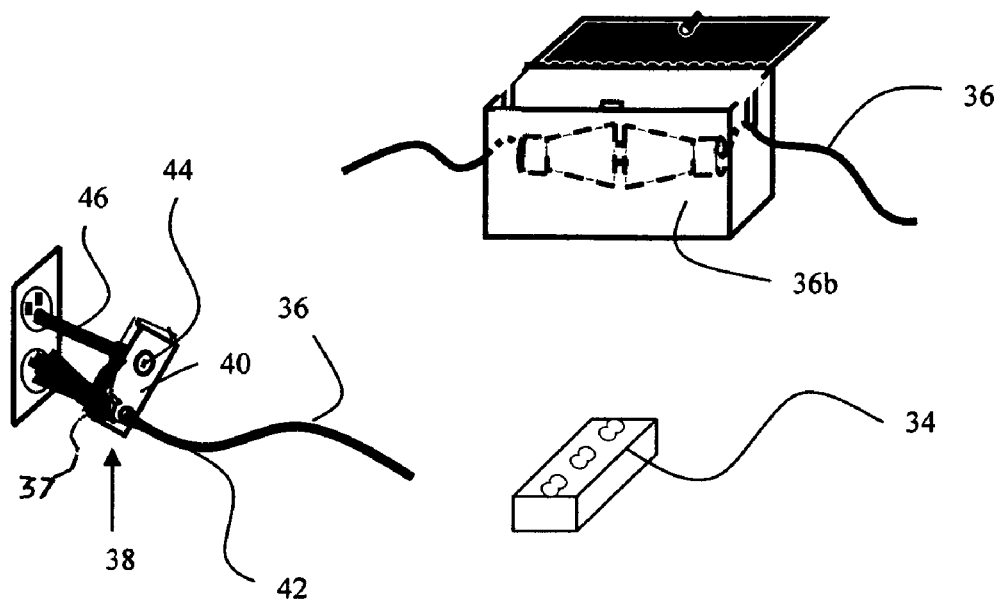
FIG. 3 is a front perspective of an electrical assembly lock.

FIG. 3 illustrates an electrical assembly lock 32, including an electric cord cable 36, said cable 36 extending through said first hole 22 of FIG. 1, and exteriorly, a cable connector 36b, including an outlet connector lock 38. The lock connector 38 comprises: a panel 40, an opening 42, a pivot latch 37, a key lock 44, the opening 42 allows cable 36 to pass through. Panel 40 includes a threaded connector 46, for attaching said panel to a power outlet by inserting said treaded connector 46 into a ground hole the top pert of electrical outlet, and twisting it until tight on Said plug cable 36 which it plug into the bottom of electrical outlet. By turning said key lock, the latch 37 pivots and lock said threaded connector 46. When cable 36, is plugged in, it prevents unplug. Said threaded connector 46 prevents extraction of said outlet connector lock when cable 36 is plugged in it prevents rotation of panel 40.

Electrical housing 34 install in portable toolbox locker.

Figure 4:
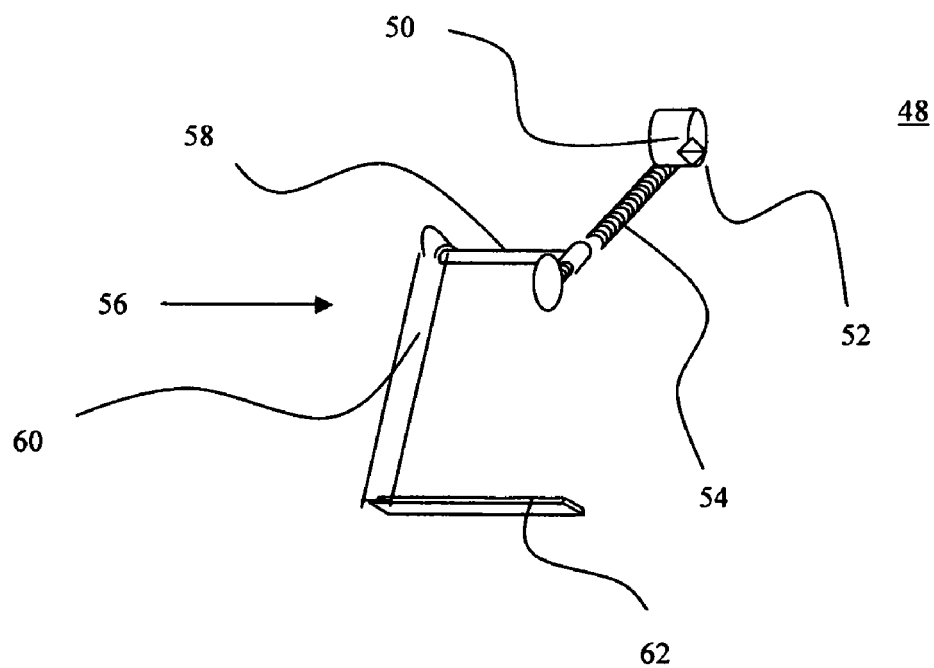
FIG. 4 is a front perspective of a securing system.

FIG. 4 illustrates a front perspective of the securing system clamp 48 in detail. The securing system 48 includes, a handle 50, including a lock 52, a stem 54 including threads, connected to said handle 50, through said second hole 24, a adjustable securing brace 56, including a stem member 58, a first 60 and a second brace member 62, said stem member 58 connected to threaded stem 54 and first brace member 60, said first brace member 60 connected to said second brace member 62, said second brace member 62, perpendicular to said first brace member 60, wherein first rotation of said handle 50, extends said adjustable securing brace 56 to fit around a support structure 1, such as wall with a door jam 78, and a second rotation, secures and locks said portable toolbox 2 to said structure 1.

The second brace member 62, in one embodiment, fits within a first plurality of securing brackets 64 on said sixth wall 26, FIG. 1, securing said portable toolbox to said structure 1. In another embodiment, said second brace member 62 fits within an inner housing of said sixth wall 26, securing said portable toolbox to said structure 1. In another embodiment, said first 60 and second brace members 62 are exterior to said tool storage compartment.

Figure 5:
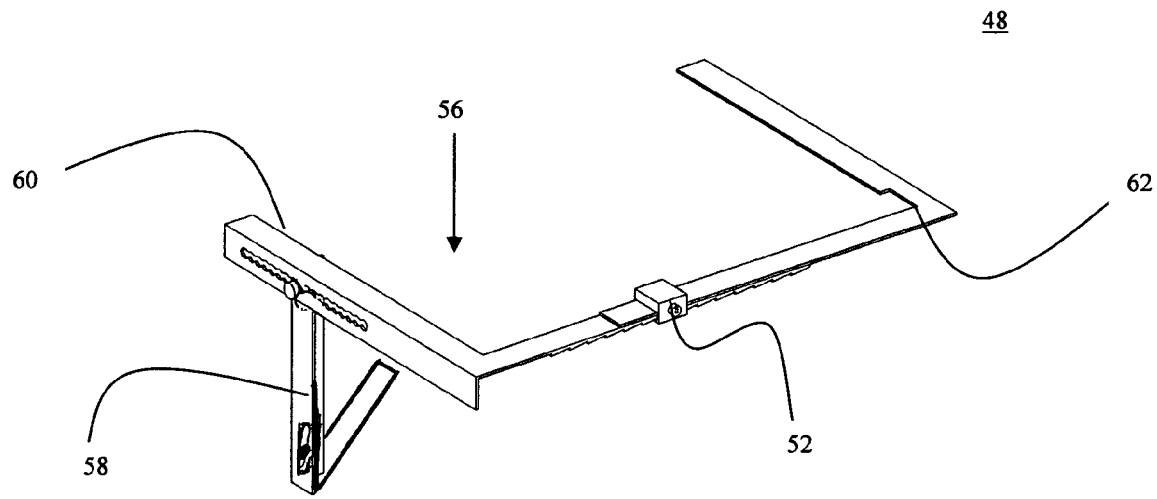
FIG. 5 is a front perspective of an embodiment of the securing system clamp.
Figure 6:
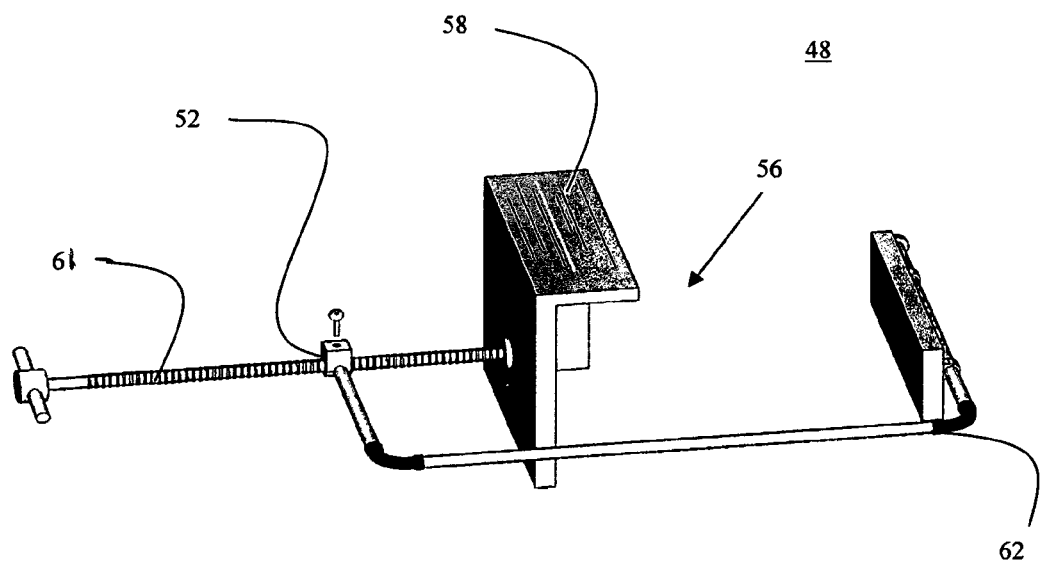
FIG. 6 is a front perspective of another embodiment of securing system clamp.

FIGS. 5 and 6 illustrate a front perspective of alternate embodiments of said securing system clamp 48, in detail. The securing system 48 includes, a lock 52, a adjustable securing brace 56, including a stem member 58, a first 60 and a second brace member 62, said stem member 58 connected to said first brace member 60, said first brace member 60 connected to said second brace member 62, said second brace member 62, wherein a first adjustment of said stem member 58, comports to a width of a toolbox, FIG. 5, said stem member 58 is adjustable to wrap the edge of the tool box, in unlock position by pushing first 60 and second 62 brace member to a structure 1 and turn the key 52 the securing system clamp 48 will tide the tool box to a structure 1. in second embayment in FIG. 6, of said first 60 and second 62 brace member, extends said adjustable securing brace 56 to fit around a support structure 1, such as a door jam 78, by tiding threaded brace 61 and turn the key 52 the securing system clamp 48 will tide the tool box to a structure 1.

a third adjustment, secures and locks said portable toolbox to said structure 1.

The second brace member 62, in one embodiment, fits within a first plurality of securing brackets 64 on said sixth wall 26, FIG. 1, securing said portable toolbox locker to said structure 1. In another embodiment, said second brace member 62 fits within an inner housing of said sixth wall 26, FIG. 1, securing said portable toolbox to said structure 1.

Figure 7:
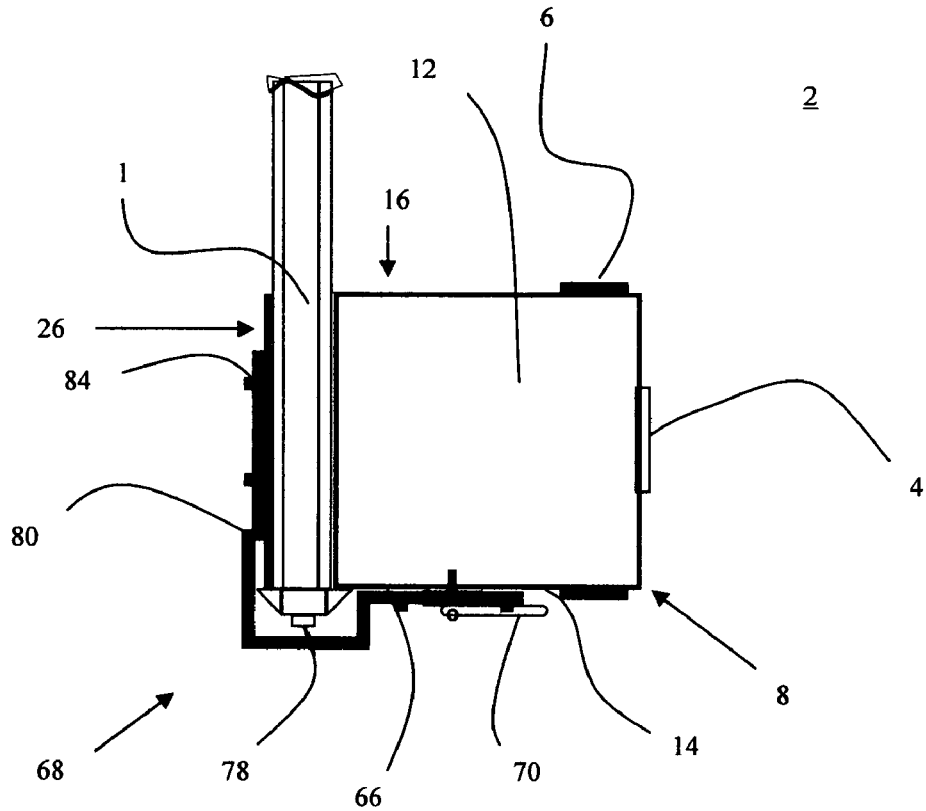
FIG. 7 is a top-view perspective of another embodiment of a portable toolbox locker.
Figure 8:
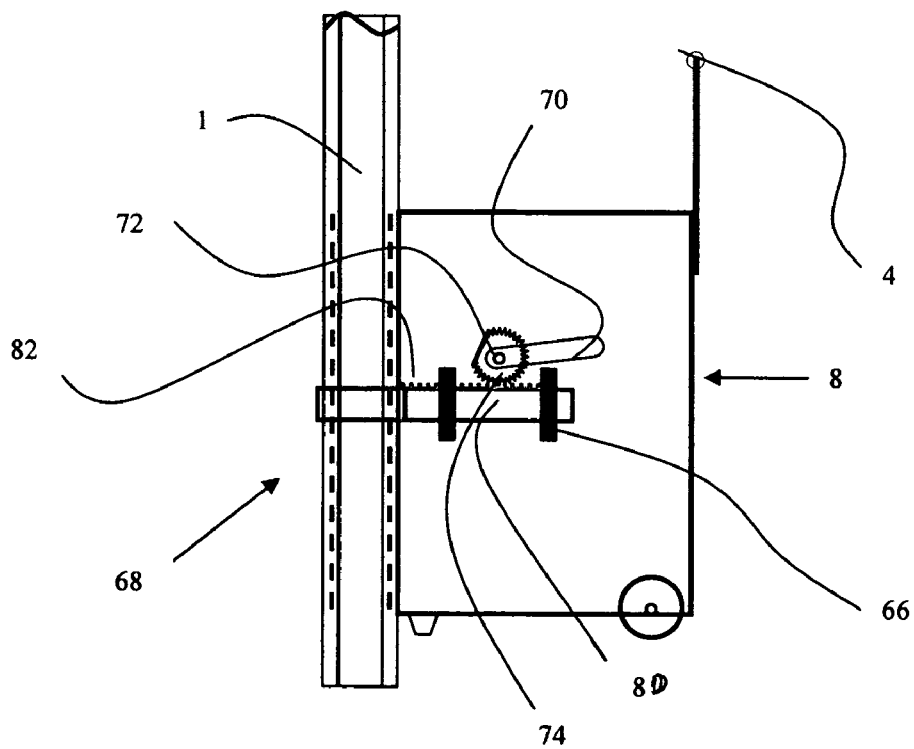
FIG. 8 is a side-view perspective of said embodiment in FIG. 7.

FIGS. 7 and 8 illustrate a top-view and a side view of said portable toolbox locker, respectively, according to another embodiment. The portable toolbox locker includes a control handle 4, a plurality of wheels 6, a tool storage compartment 8, an electrical assembly 32, FIG. 3, and a securing system 68.

The tool storage compartment 8, including a third wall 14 FIG. 1 having a first plurality of securing brackets 66, opposing a fourth wall 16. FIG. 1 The securing system 68, comprising: exteriorly, a handle 70, including a lock 72 and gear 74, a adjustable securing brace 80, said brace 80, including a plurality of teeth 82 on at least one side, through said first plurality of securing brackets 66, contacting said gear 72, to said brace 80, wherein first rotation of said handle 70, extends said adjustable securing brace 80 to fit around a support structure 1, and a second rotation, secures said portable toolbox to said structure 1, such as wall with a door jam 78.

In this embodiment, said sixth wall 26 includes a pin 84, extending through said sixth wall 26, accessible interiorly. In another embodiment, said sixth wall 26 includes an inner housing. The brace member 80 fits within said plurality of securing pins 84 or said inner housing, securing said portable toolbox locker to said structure 1, such as a wall with a door jam 78. In another embodiment, said brace 80 are exterior to said tool storage compartment.

In use, said portable toolbox, containing tools in a tool storage compartment 8, a electrical assembly 32 and a securing system 48, is controlled by a user via a control handle 4 and a plurality of wheels 6.

The portable toolbox is pushed up next to a structure, such as wall 1, with a door jam 78, to be secured. The sixth wall 26, a plurality of hinge pins 30, said plurality of hinge pins 30 positioned to fit within hinge receptors 18 of said fourth wall 16, are detached, allowing said sixth wall 26 to be removed, or in one embodiment, folded back against said fourth wall 16.

The tool storage compartment 8, including the electrical assembly 32 includes said electrical housing 34 and said cable 36, said cable 36 said cable 36 extending through said hole 22, FIG. 1, and exteriorly, a cable connector 36*b*, including a outlet connector lock 38. The outlet connector 38 comprising: a panel 40, a opening 42, a latch 37, a lock 44, said opening 42, housing a cable 36, said opening 42, including a cable housing, panel 40, including a threaded connector 46 attach, by inserting said threaded connector 46 into a ground hole of a first half of electrical outlet, and twisting said panel 40 until tide, then plaguing said cable 36 plug into secant half of electrical outlet by turning the key the said latch 37 surround said cable 36. wherein said cable 36 plugged in it prevents rotation of said plug. said a cable connector 36*b*, including a lock, providing security to connecting cables that are too short, said outlet connector lock 38, is pressed against said structure 1, such as a door jam. Electrical tools, or rechargeable tools, remain plugged into said electrical housing and are secured within said tool storage compartment 8 and said outlet connector lock 38.

in one embodiment, said first opening 42, including a cable housing adjuster for varied sized cables, said cable 36 is plugged into a outlet of a electrical outlet, said cable 36 plugged in prevents rotation of said panel 40, and said threaded connector 46 prevents extraction of said outlet connector lock 38, securing said electrical or rechargeable tools.

In an embodiment, the securing system 48 including, a handle 50, a lock 52, a stem 54 including threads, connected to said handle 50, through said second hole 24, a adjustable securing brace 56, including a stem member 58, a first 60 and a second brace member 62, said stem member 58 connected to said first brace member 60, said first brace member 60 connected to said second brace member 62, said second brace member 62, perpendicular to said first brace member 60, where a first rotation of said handle 50, extends said adjustable securing brace 56 outward to fit around a support structure 1, such as a door jam, a second rotation contacts said second brace member 62 with said structure 1, locked by lock 52, securing said portable toolbox 2 to said structure 1.

In another embodiment, said second brace member 62 fits within said first plurality of securing brackets 64 or said inner housing, of said sixth wall 26, securing said portable toolbox to said structure 1. In another embodiment, said first 60 and second brace members 62 are exterior to said tool storage compartment and provides the same securing function.

In another embodiment, said portable toolbox 2, containing tools in a tool storage compartment 8, a electrical assembly 32 and a securing system 68, is controlled by a user via a control handle 4 and a plurality of wheels 6. The securing system 68, comprising: exteriorly, a handle 70, including a lock 72 and gear 74, a adjustable securing brace 76, including a brace 80, said brace 80, including a plurality of teeth 82 on at least one side, through said first plurality of securing brackets 66, contacting said gear 74, to said brace 80, wherein first rotation of said handle 70, extends said adjustable securing brace 76 to fit around a support structure 1, and a second rotation, secures said portable toolbox to said structure 1.

In one embodiment, said sixth wall 26 includes a second plurality of securing pins 84, extending through said sixth wall 26, accessible interiorly. In another embodiment, said sixth wall 26 includes an inner housing. The brace 80 fits within said plurality of securing pins 84 or said inner housing, securing said portable toolbox to said structure 1. In another embodiment, said brace 80 is exterior to said tool storage compartment.

Advantages of the portable toolbox are the ability to store large quantity of tools on a construction job site, remain portable, and provide safe and effective security for rechargeable type tools, big electrical tools, and other expensive tools, in a fast, effective and a convenient manner.

Construction workers are faced with growing thefts on job sites. Whether the construction site itself is plundered for construction material, tools or toolboxes taken during breaks, construction workers must have an effective means of storing equipment, specifically, large amounts of expensive equipment, many times electrical or rechargeable, in a safe and time effective manner.

The portable toolbox locker provides the ability to have a large amount of tools, secure in and out of the tool storage compartment 8, and being mobile, by using the control handle 4 and the plurality of wheels 6. Many times transportation from one point to the next takes time, cutting into breaks and meetings, becoming convenient to lock the toolbox and leave. The portable toolbox locker provides the ability to lock to common structures found on construction job sites, i.e. will, door jams, and framing by use of the securing system 48 on in another embodiment securing system 68, to secure the portable toolbox.

The portable toolbox also provides security for tools that are rechargeable or electrical to remain plugged into the electrical housing 34 of the electrical assembly 32, secured within the tool storage compartment 8 and also secure plugged into an electrical outlet by the outlet connector lock 38.

What is claimed:

1. A method for locking a cable plug to a wall outlet comprising the steps of;
    plugging a power cord plug into a bottom electrical outlet, wherein the power cord passes through an opening;
    attaching a lock connector to a top electrical outlet, said lock connector having a panel, a threaded connector, an opening, a pivot latch, a key lock, and turning a key into said key lock causing said pivot latch to turn and lock the power cord plug to the bottom electrical outlet.

2. A method as in claim 1, wherein said step of attaching said lock connector to said top outlet further comprising:
   inserting said power plug into a bottom part of said outlet;
   inserting said threaded connector into the ground hole of said top part electrical outlet; and twisting until tight.

3. A locking device for locking a power cord plug to a power outlet comprising:
   a panel;
   an opening for allowing a power cord to pass through said panel;
   a threaded connector connected to said panel for attaching to a top part of a power outlet;
   a key lock attached to said panel;
   a pivot latch connected to said key lock such that turning a key into said key lock causes said pivot latch to turn and to lock the power cord plug to the power outlet.

4. A locking device assembly for preventing toolbox theft comprising:
   a power cord with a plug for connecting one or more power tools inside a toolbox to a power outlet, said power cord emerging from said toolbox; and
   a lock connector having a panel, a threaded connector connected to said panel, a key lock and a pivot latch connected to said key lock, said lock panel further having an opening for receiving the power cord and rotation of the pivot latch serving to lock the plug to the power outlet.

* * * * *